United States Patent [19]
Rohrbach

[11] Patent Number: 5,898,783
[45] Date of Patent: Apr. 27, 1999

[54] SYSTEM AND METHOD FOR EMPLOYING A TELECOMMUNICATIONS NETWORK TO REMOTELY DISABLE A SIM OR SMARTCARD

[75] Inventor: William R. Rohrbach, Towaco, N.J.

[73] Assignee: Lucent Technologies, Inc., Murray Hill, N.J.

[21] Appl. No.: 08/748,843

[22] Filed: Nov. 14, 1996

[51] Int. Cl.⁶ .................................................... H04L 9/00
[52] U.S. Cl. .................................... 380/49; 380/4; 380/9; 380/23; 380/25; 380/50; 380/59; 340/825.31; 340/825.34; 455/26.1; 455/410; 455/411; 327/524; 327/525
[58] Field of Search ..................................... 380/4, 23, 25, 380/49, 50, 59, 9; 340/825.31, 825.34; 455/26.1, 403, 404, 410, 411; 327/524, 525

[56] References Cited

U.S. PATENT DOCUMENTS

| | | |
|---|---|---|
| 5,029,233 | 7/1991 | Metroka . |
| 5,301,223 | 4/1994 | Amadon et al. . |
| 5,444,764 | 8/1995 | Galecki ..................................... 455/411 |
| 5,600,708 | 2/1997 | Meche et al. ............................ 455/411 |
| 5,659,595 | 8/1997 | Chanu et al. ............................ 455/411 |

OTHER PUBLICATIONS

"Australian Cellular Mobile Phones" on the Internet at ourworld.compuserve.com/homepages/stewart_fist/mobile.htm; no author given; no date given; copied on Jul. 23, 1998.

Jose Luis Zoreda, "Smart Cards—Chapter 4—Anatomy of a Smart Card," Artech House 1994, pp. 55–58.

"ISO7816 Asynchronous Smartcard Information," Internet Web Site, http://iso7816.txt at www.hut.fi, Dec. 6, 1995, 20 pages.

Motorola, "Twenty Years On and the Smartcard Remains Unbeaten," http://motsps.com/csic/smartcrd/library/city-rev.html, 2 pages, 1998.

Smart Card Forum, "Just the Facts," Internet Web Site http://www. smartcrd.com/news/factoids.htm, 3 pages, 1998.

Smart Card Forum, "What is a Smart Card," Internet Web Site http://www.smartcrd.com/news/whatis.htm, 2 pages, 1998.

*Primary Examiner*—Bernarr E. Gregory

[57] ABSTRACT

In a smartcard having a subscriber identity module ("SIMI") that cooperates with a mobile station to effect communication with a telecommunications network, a system for, and method of, disabling the smartcard. The system includes: (1) data commnications circuitry that transmits a code uniquely identifying the smartcard from logic circuitry within the smartcard to the telecommunications network via the mobile station, the code employable by the telecommunications network to search a disable database associated therewith, the telecommunications network returning a disable command if the code is found in the disable database and (2) disabling circuitry that incapacitates the logic circuitry to prevent an operation thereof, the smartcard being incapacitated with respect to the telecommunications network and systems independent of the telecommunications network.

20 Claims, 3 Drawing Sheets

SYSTEM AND METHOD FOR EMPLOYING A TELECOMMUNICATIONS NETWORK TO REMOTELY DISABLE A SIM OR SMARTCARD

TECHNICAL FIELD OF THE INVENTION

The present invention is directed, in general, to subscriber-based telecommunications networks and, more specifically, to a system and method for employing a telecommunications network to remotely disable a subscriber identity module ("SIM") card or smartcard.

BACKGROUND OF THE INVENTION

Magnetic-strip based credit, debit and calling cards are now in virtually everyone's pocket and it would be difficult indeed to imagine day-to-day life without them. Their very technological simplicity, however, is a double-edged sword, bringing convenience to consumer financial transactions on one hand while, on the other, they are directly responsible for creating ever-increasing occurrences of fraud. In the telecommunications sector, pre-paid cards for use in public call boxes have reduced theft by removing the use of cash to operate the call boxes. Additionally, new mobile telecommunications systems, such as the Global System for Mobile Communications ("GSM") and Personal Communications Network ("PCN"), are calling for more "intelligence" and security to be embedded in the network.

New mobile telecommunications services are leading to an ever-expanding use of SIMs and so-called smartcards whose functionality is embedded on a silicon chip rather than on a magnetic strip of a card. SIMs generally have a memory chip that contain data such as the identity of the cardholder (i.e. service subscriber), billing information and home location. Smartcards are more complex variants of SIMs and can contain microprocessors that execute complex algorithms for transaction management, data encryption and user authentication. In combination, a SIM may be included within a smartcard to identify the user of the telecommunications system. A SIM or smartcard can also be employed in a mobile telecommunications environment for the purpose of billing the call to the user's home account (regardless of the state lines or service providers).

The potential applications for SIMs and smartcards, however, extend far beyond mobile telecommunications. Applications for SIMs and smartcards include: electronic money, where a user can add value to the card at an automatic teller machine ("ATM"), healthcare, wherein the card can be used to store information regarding the user's allergies, prescriptions, and medical history, and public transportation, where value can be added to the card and then deducted as the passenger passes by an automatic reader on a bus or train. A user may also store personal information on the card such as addresses and telephone numbers.

As with all forms of card-based technology, however, counterfeiting and fraud are key issues. One measure to protect against fraud, introduced by banks for ATM cards and telecommunications companies for calling cards, is the personal identity number ("PIN"). The security of the PINs depends on keeping the PIN separate from the card. However, experience has demonstrated that many users do not adequately secure the PIN from the respective card (e.g., bank, credit or telephone card) thereby resulting in significant opportunities for counterfeiting and fraud. Moreover, electronic means may be used to bypass protections afforded by PINs.

While GSM mobile telecommunications systems provide some protections against fraud vis-a-vis analog systems, it may be possible for sophisticated thieves to duplicate SIMs and smartcards. Unlike cards that are inserted into an ATM, however, stolen or counterfeited SIMs and smartcards cannot be confiscated when used with a mobile telephone or wireless device.

Accordingly, what is needed in the art is a system and method for use in a telecommunications network that can remotely disable SIMs and smartcards, thereby discouraging theft and counterfeiting.

SUMMARY OF THE INVENTION

To address the above-discussed deficiencies of the prior art, the present invention provides, in a SIM card, or smartcard having a SIM, that cooperates with a mobile station to effect communication with a telecommunications network, a system for, and method of, disabling the card. The system includes: (1) data communications circuitry that transmits a code uniquely identifying the card from logic circuitry within the card to the telecommunications network via the mobile station, the code employable by the telecommunications network to search a disable database associated therewith, the telecommunications network returning a disable command if the code is found in the disable database and (2) disabling circuitry that incapacitates the logic circuitry to prevent an operation thereof, the card being incapacitated with respect to the telecommunications network and systems independent of the telecommunications network. As used herein, "GSM", "PCN," "personal communicator", and "mobile station" are used interchangeably, and are intended to include all wireless devices capable of employing a card having a SIM to facilitate communications with a telecommunications network.

The present invention therefore provides a way of disabling SIMs and smartcards remotely. The card is not merely disabled with respect to the telecommunications network but, rather, the card is disabled for all purposes. As described above, a single SIM or smartcard is suited for use with a variety of systems and networks. Their flexibility and power make them attractive targets for fraud and theft (including counterfeiting). Accordingly, it is not sufficient to remove the card's privileges only with respect to the telecommunications network. The card should be disabled entirely.

"Logic circuitry," for purposes of the present invention, is defined as data processing or storage circuitry and interconnecting circuitry located on a card, including, without limitation, a processor, memory, support circuitry and any address, data and control buses.

In one embodiment of the present invention, the disabling circuitry permanently incapacitates the logic circuitry. In this embodiment, the logic circuitry is permanently cut off from its source of power or is destroyed, rendering the smartcard permanently useless. Alternatively, however, the card may be rendered useless only temporarily. Such may occur if memory within the card is merely erased.

In one embodiment of the present invention, the disabling circuitry comprises a selected one of a fuse and a switch, the selected one capable of decoupling electrical power from a processor within the card. Those skilled in the art are aware that smartcards conventionally contain a processor that manages the processing of data in the smartcard. The present invention may operate to disable the processor by cutting it off from its source of power. Other means for deactivating the processor are within the broad scope of the present invention.

Likewise, those skilled in the art are aware that SIMs and smartcards conventionally contain memory that stores data. Thus, in one embodiment of the present invention, the disabling circuitry decouples a memory of the card from a source of electrical power. The present invention may operate to disable the memory by cutting it off from its power. Other means for deactivating the memory are within the broad scope of the present invention.

In one embodiment of the present invention, the disabling circuitry permanently erases a memory of the card. The memory may be provided with an excessive voltage that causes the memory to malfunction. While the memory may receive power, it cannot otherwise function.

In one embodiment of the present invention, the disable database contains codes corresponding to stolen smartcards, or codes corresponding to known counterfeited or cloned cards. The present invention prevents, or at least discourages, illegal possession or use of SIMs and smartcards. Smartcards may be disabled for other reasons, however, such as a user's failure to pay for services. The broad scope of the present invention is not limited by the purpose for disabling of the card.

In one embodiment of the present invention, the logic circuitry is employed to encrypt communications between the mobile station and the telecommunications network. As smartcards are further developed over time, the logic circuitry may be used for more than just encryption. The broad scope of the present invention is not limited by other capacities in which the logic circuitry may be employed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
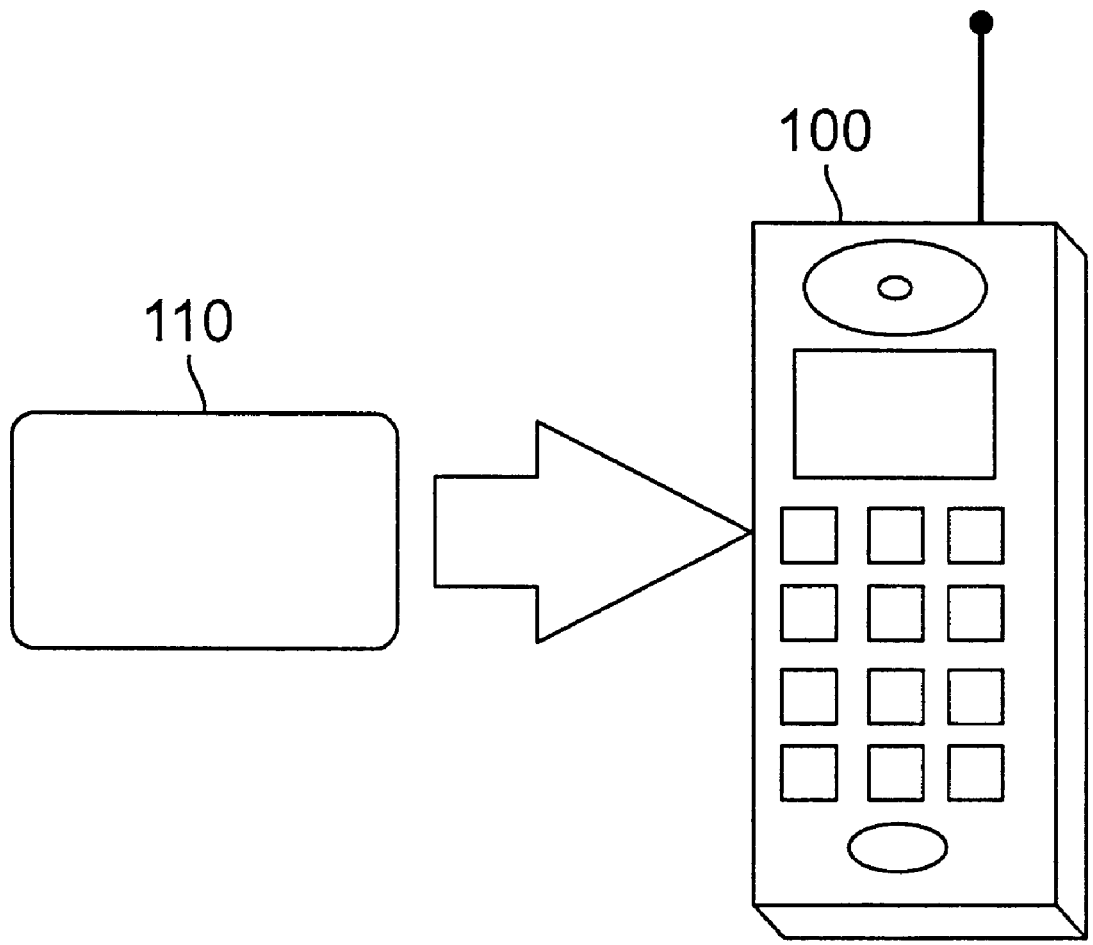
FIG. 1 illustrates a mobile station operative to receive a SIM or smartcard that cooperates with the mobile station to effect communication with a telecommunications network.

Referring initially to FIG. 1, illustrated is a mobile station 100 that is operative to receive a SIM card 110 (or smartcard including a SIM) that cooperates with the mobile station 100 to effect communication with a telecommunications network (not shown). The SIM card 110 is used to identify the user to the telecommunications network, to authenticate that the mobile station 100 is permitted on the network, and, in one embodiment, to encrypt communications between the mobile station 100 and the telecommunications network.

Figure 2:
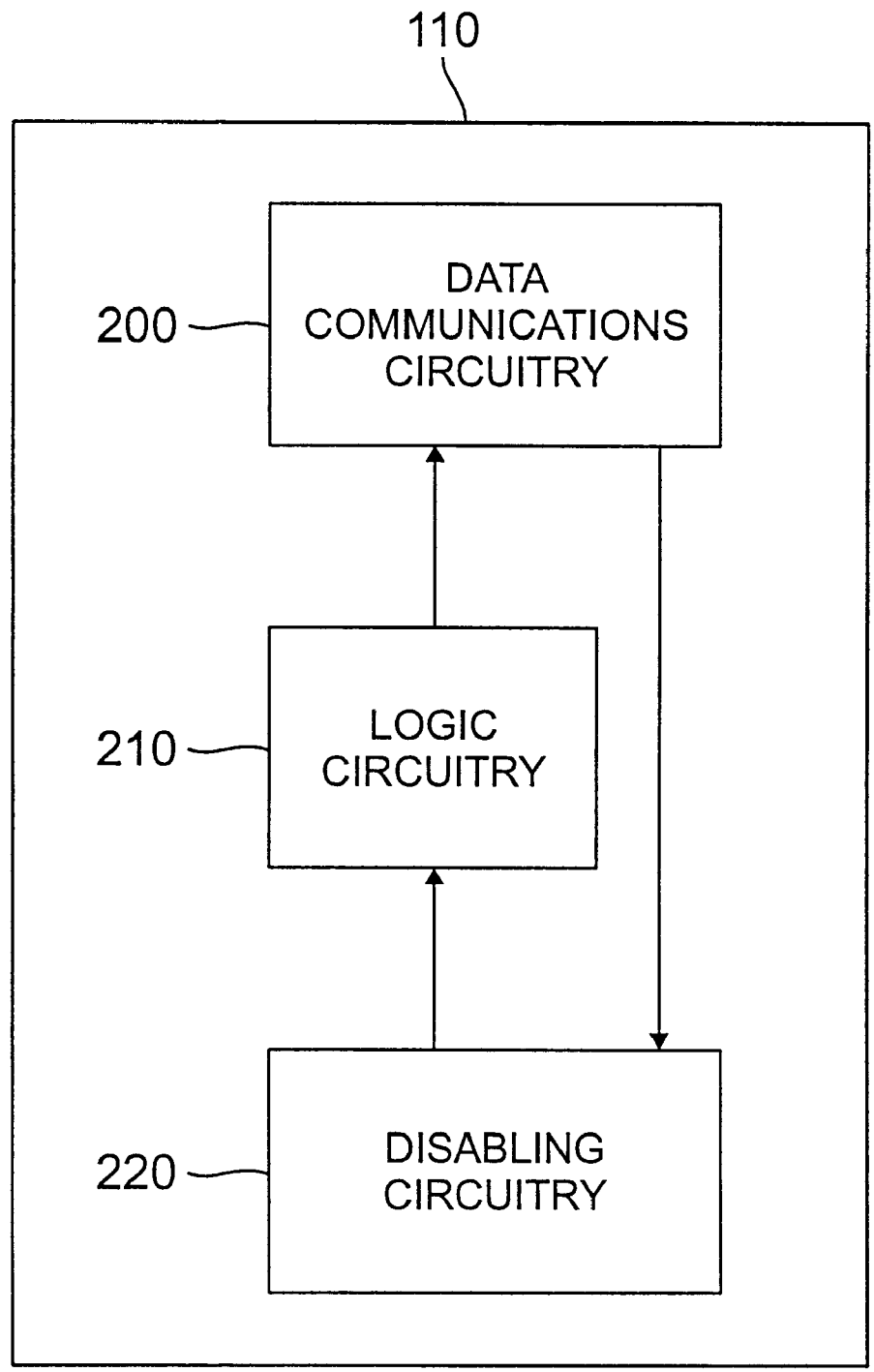
FIG. 2 illustrates a block diagram of a SIM according to the principles of the present invention.

Turning now to FIG. 2 (with continuing reference to FIG. 1), illustrated is a block diagram of a SIM card 110 according to the principles of the present invention. The SIM card 110 functionally includes data communications circuitry 200, logic circuitry 210 and disabling circuitry 220. The logic circuitry 210, in the present embodiment, includes data processing, storage circuitry and interconnecting circuitry, and also includes a processor, memory, support circuitry and address, data and control buses (not shown).

The data communications circuitry 200 is operative to transmit a code uniquely identifying the SIM card 110, from logic circuitry 210 within the card, to the telecommunications network via the mobile station 100. The telecommunications network searches a disable database and returns a disable command if the unique code identifying the SIM card 110 is found in the disable database. In response to receiving a disable command, the disabling circuitry 220 is operative to incapacitate the logic circuitry 210 to prevent or limit further operation thereof, the SIM card 110 thereby being incapacitated with respect to the telecommunications network and systems independent of the telecommunications network.

Thus, the present invention provides a way of disabling SIMs (or a smartcard having a SIM) remotely. The SIM card 110 is not merely disabled with respect to the telecommunications network but, rather, the card is disabled for all purposes. As described above, a single SIM or smartcard is suited for use with a variety of systems and networks. Their flexibility and power make them attractive targets for fraud and theft (including counterfeiting). Accordingly, it is not sufficient to remove the card's privileges only with respect to the telecommunications network. The card should be disabled entirely.

In the present embodiment of the present invention, the disabling circuitry 220 is operative to permanently incapacitate the logic circuitry 210. As a result, the logic circuitry 210 may be permanently cut off from its source of power, or is destroyed, rendering the SIM card 110 permanently useless. Alternatively, the SIM card 110 may be rendered useless only temporarily, for example, if logic circuitry 110 is comprised of non-volatile memory that is merely erased.

Those skilled in the art are aware that smartcards conventionally contain a processor that manages the processing of data in the smartcard. Thus, in a further embodiment of the present invention, if logic circuitry 210 is comprised of a processor, the disabling circuitry 220 may be either a fuse or a switch that is operative to decouple electrical power from the processor within the smartcard. Other means for deactivating the processor, however, are within the broad scope of the present invention.

Likewise, those skilled in the art are aware that SIMs and smartcards conventionally contain memory that stores data. Thus, in an alternative embodiment of the present invention, if logic circuitry 210 includes a memory, the disabling circuitry 220 may be operative to disable the SIM card 110 by decoupling the memory from a source of electrical power. If such memory is non-volatile, merely decoupling the memory from a source of power will not destroy the data contained therein. Thus, the SIM card 110 may be re-enabled, if desired, with no loss of data. In yet another alternative embodiment, the disabling circuitry 220 is operative to permanently erase the memory of logic circuitry 210, for example, by providing it with an excessive voltage that causes the memory to malfunction. While the memory may receive power, it cannot otherwise function. Other means for deactivating the memory, however, are within the broad scope of the present invention.

In a yet another embodiment of the present invention, the logic circuitry 210 may be employed to encrypt communications between the mobile station 100 and the telecommunications network. As smartcards are further developed over time, the logic circuitry 210 may be used for more than just encryption. The broad scope of the present invention is not limited by other capacities in which the logic circuitry 210 may be employed.

Figure 3:
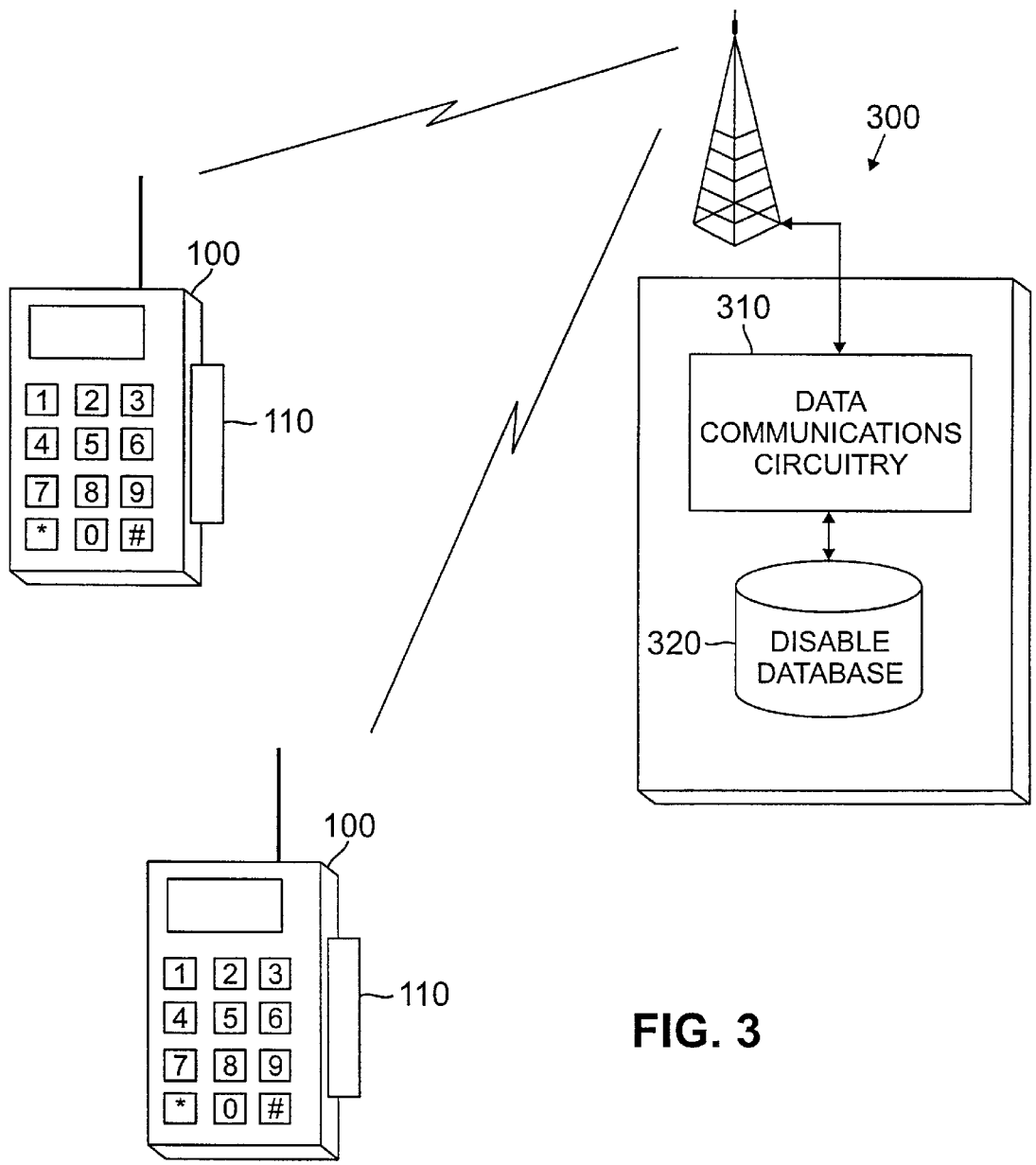
FIG. 3 illustrates a block diagram of an exemplary telecommunications network capable of communicating with a plurality of mobile stations that cooperate with a card having a subscriber identity module ("SIM") to effect communication with the telecommunications network.

Turning now to FIG. 3, illustrated is a block diagram of an exemplary telecommunications network 300 capable of communicating with a plurality of mobile stations 100 that cooperate with a card 110 having a subscriber identity module ("SIM") to effect communication with the telecommunications network 300. As previously mentioned, each of the cards 110 has a unique SIM code that is transmitted to the telecommunications network upon the initiation of access. The telecommunications network 300 includes data communications circuitry 310 that is operative to receive the unique SIM codes and search a disable database 320 for the code. The disable database 320 contains a plurality of codes corresponding to a plurality of cards 110 that are to be disabled, and may contain the unique code for a particular SIM, for example, if the card has been reported as stolen. The data communications circuitry 310 is also operative to transmit a disable command to a particular mobile station 100 if the SIM code for the card 110 is found in the disable database 320.

Those skilled in the art should understand that while the present invention may be embodied in hardware that alternative embodiments may include software or firmware, or combinations thereof. Such embodiments may include implementations using conventional processing circuitry such as, without limitation, programmable array logic ("PAL"), digital signal processors ("DPSs"), field programmable gate array ("FPGA"), application specific integrated circuits ("ASICs"), large scale integrated circuits ("LSIs"). Moreover, the present embodiment is introduced for illustrative purposes only and other embodiments that provide a system for and method of disabling a SIM card are well within the broad scope of the present invention. Conventional computer, and processing, system architecture is more fully discussed in *Computer Organization and Architecture*, by William Stallings, MacMillan Publishing Co. (3rd ed. 1993). Conventional processing system network design is more fully discussed in *Data Network Design*, by Darren L. Spohn, McGraw-Hill, Inc. (1993). Conventional voice and data communications are more fully discussed in *Data Communications Principles*, by R. D. Gitlin, J. F. Hayes and S. B. Weinstein, Plenum Press (1992), *The Irwin Handbook of Telecommunications*, by James Harry Green, Irwin Professional Publishing (2nd ed. 1992) and *Voice & Data Communications Handbook*, by Regis J. Bates, Jr. and Donald Gregory, McGraw-Hill (1996). Conventional electronic circuit design is more fully discussed in *The Art of Electronics*, by Paul Horowitz and Winfield Hill, Cambridge University Press, (2nd ed. 1989). Conventional control systems and architectures are discussed in *Modern Control Engineering* by Katsuhiko Ogata, Prentice Hall 1990. Each of the foregoing publications is incorporated herein by reference.

Although the present invention has been described in detail, those skilled in the art should understand that they can make various changes, substitutions and alterations herein without departing from the spirit and scope of the invention in its broadest form.

What is claimed is:

1. In a card having a subscriber identity module (SIM) that cooperates with a mobile station to effect communication with a telecommunications network, a system for disabling said card, comprising:

data communications circuitry that transmits a code uniquely identifying said card from logic circuitry within said card to said telecommunications network via said mobile station, said code employable by said telecommunications network to search a disable database associated therewith, said telecommunications network returning a disable command if said code is found in said disable database; and disabling circuitry that incapacitates said logic circuitry to prevent an operation thereof, said card being incapacitated with respect to said telecommunications network and systems independent of said telecommunications network.

2. The system as recited in claim 1 wherein said disabling circuitry permanently incapacitates said logic circuitry.

3. The system as recited in claim 1 wherein said disabling circuitry comprises a selected one of a fuse and a switch, said selected one capable of decoupling electrical power from a processor within said card.

4. The system as recited in claim 1 wherein said disabling circuitry decouples a memory of said card from electrical power.

5. The system as recited in claim 1 wherein said disabling circuitry permanently erases a memory of said card.

6. The system as recited in claim 1 wherein said disable database contains codes corresponding to stolen cards.

7. The system as recited in claim 1 wherein said logic circuitry is employed to encrypt communications between said mobile station and said telecommunications network.

8. For use in a card having a subscriber identity module (SIM) that cooperates with a mobile station to effect communication with a telecommunications network, a method of disabling said card, comprising the steps of:

transmitting a code uniquely identifying said card from logic circuitry within said card to said telecommunications network via said mobile station, said code employable by said telecommunications network to search a disable database associated therewith;

receiving a disable command from said telecommunications network if said code is found in said disable database; and incapacitating said logic circuitry to prevent an operation thereof, said card being incapacitated with respect to said telecommunications network and systems independent of said telecommunications network.

9. The method as recited in claim 8 wherein said step of incapacitating comprises the step of permanently incapacitating said logic circuitry.

10. The method as recited in claim 8 wherein said disabling circuitry comprises a selected one of a fuse and a switch, said method comprising the step of decoupling electrical power from a processor within said card.

11. The method as recited in claim 8 wherein said step of incapacitating comprises the step of decoupling a memory of said card from electrical power.

12. The method as recited in claim 8 wherein said step of incapacitating comprises the step of permanently erasing a memory of said card.

13. The method as recited in claim 8 wherein said disable database contains codes corresponding to stolen cards.

14. The method as recited in claim 8 further comprising the step of employing said logic circuitry to encrypt communications between said mobile station and said telecommunications network.

15. A telecommunications network capable of communicating with a plurality of mobile stations, each of said plurality of mobile stations cooperating with a card having a subscriber identity module (SIM) to effect communication with said telecommunications network, said telecommunications network comprising:

- a disable database that contains a plurality of codes corresponding to a plurality of cards that are to be disabled;
- data communications circuitry that receives a code uniquely identifying one of said plurality of cards, said telecommunications network searching said disable database for said code, said data communications circuitry transmitting a disable command to said one of said plurality of cards if said code is found in said disable database; and
- disabling circuitry within said one of said plurality of cards that incapacitates logic circuitry therein to prevent an operation thereof, said card being incapacitated with respect to said telecommunications network and systems independent of said telecommunications network.

16. The telecommunications network as recited in claim 15 wherein said disabling circuitry permanently incapacitates said logic circuitry.

17. The telecommunications network as recited in claim 15 wherein said disabling circuitry comprises a selected one of a fuse and a switch, said selected one capable of decoupling electrical power from a processor within said card.

18. The telecommunications network as recited in claim 15 wherein said disabling circuitry decouples a memory of said card from electrical power.

19. The telecommunications network as recited in claim 15 wherein said disabling circuitry permanently erases a memory of said card.

20. The telecommunications network as recited in claim 15 wherein said disable database contains codes corresponding to stolen cards.

\* \* \* \* \*